G. P. ALTENBERG.
LUNCH KIT.
APPLICATION FILED FEB. 8, 1919.
1,393,657.
Patented Oct. 11, 1921.
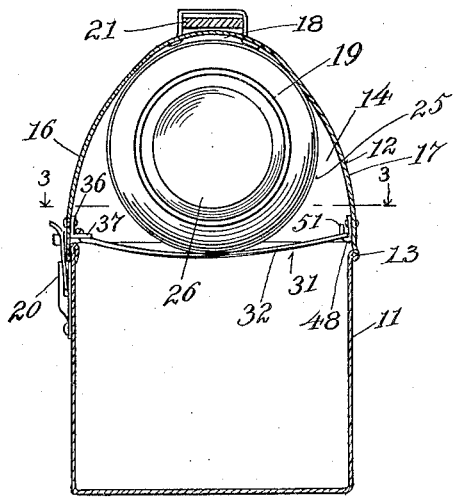
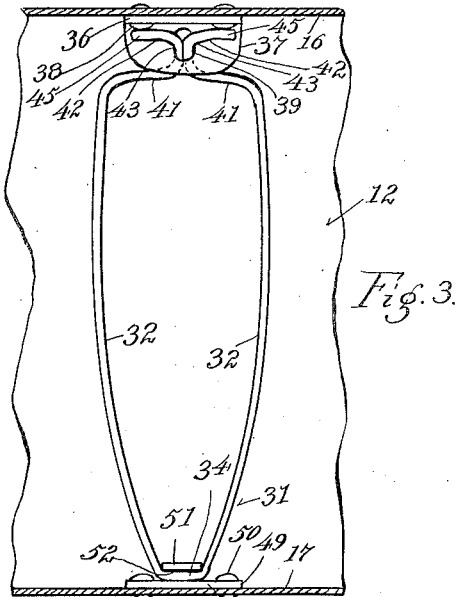
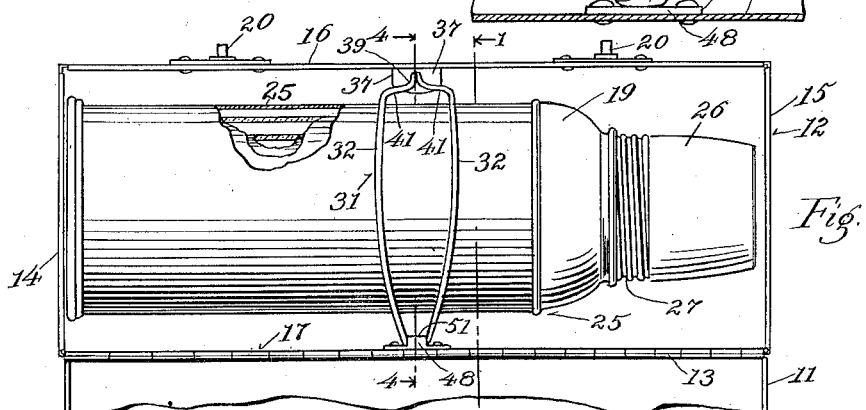
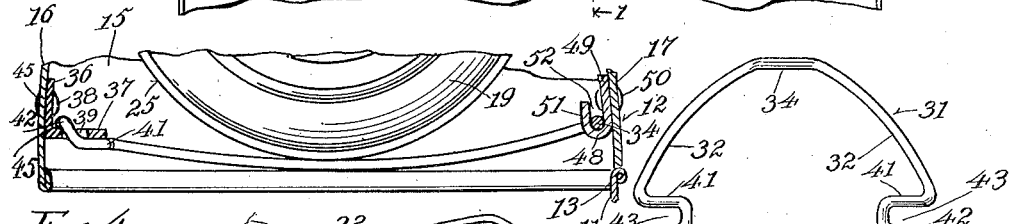
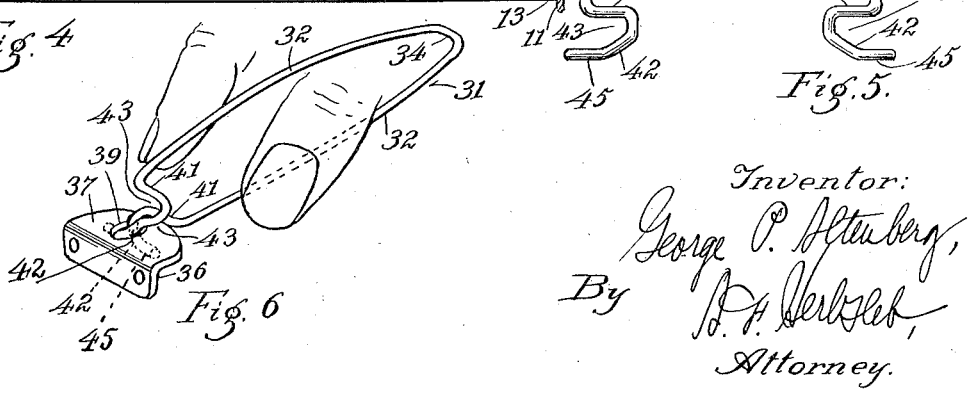
Inventor:
George P. Altenberg,
By
Attorney.

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

LUNCH KIT.

1,393,657.  Specification of Letters Patent.  Patented Oct. 11, 1921.

Application filed February 8, 1919. Serial No. 275,877.

*To all whom it may concern:*

Be it known that I, GEORGE P. ALTENBERG, a citizen of the United States, residing at Cincinnati, in the county of Hamilton and State of Ohio, have invented certain new and useful Improvements in Lunch Kits, of which the following is a specification.

My invention relates to lunch kits having a body arranged to receive articles of food, such as sandwiches, or food of other desired character, and a cover arranged to receive a heat-insulated bottle. It is the object of my invention to provide new and improved means whereby to fasten the bottle in place and simultaneously reinforce the cover or bottle receptacle.

The invention will be further readily understood from the following description and claims, and from the drawings, in which latter:

Figure 1 is a vertical cross-section of a lunch kit embodying my invention, taken in the plane of the line 1—1 of Fig. 2.

Fig. 2 is a plan view of the invention, showing the cover of the lunch kit open, and the body partly broken away.

Fig. 3 is a plan section of the same taken on the line 3—3 of Fig. 1, showing the bottle securing means in closed relation.

Fig. 4 is an enlarged cross-section taken on the line 4—4 of Fig. 2.

Fig. 5 is a perspective view of the wire loop; and,

Fig. 6 is a perspective view of the wire loop, showing the same partly entered into its pivotal connection with the bottle-receptacle.

The lunch kit comprises a body 11 and a cover 12, the latter being hinged to the body by means of a hinge 13. The cover comprises end walls 14, 15, and side walls 16, 17, the side walls being preferably bent into channel form extending lengthwise of the cover so as to form a top channel 18, shown as a rounded top, so as to readily receive a bottle 19 in said rounding and between the side walls and the respective end walls of the cover. The cover forms a bottle-receptacle. The lower ends of the walls of the cover are received telescopingly over the upper edges of the walls of the body when the cover is closed. Suitable catches 20 are arranged to hold the cover in closed relation while carrying the same, the carrying being by means of a suitable carrying strap 21 suitably held to the cover. A lunch-kit of this character is shown and described in Patent No. 1,276,852, granted on my application, and dated August 27, 1918.

The bottle is exemplified as a vacuum-insulated bottle of any usual construction, comprising for instance a glass vacuum insulated inner member or filler and a suitable casing 25, and having a suitable cup 26, suitably releasably secured to the casing as by means of a screw-connection 27, the casing and cup being preferably of metal, and constructed for instance as shown and described in Patent No. 900,075, granted me October 6, 1908, for improvements in double walled vessels.

A strap 31 releasably connects the side walls of the bottle-receptacle or cover. This strap is a comparatively stiff strap so as to resist movement of the ends of the strap toward and from each other, and is arranged to be received across the bottle position and to connect the side walls of the bottle-receptacle or cover for preventing endwise separation or approach between said side walls, and to reinforce the bottle-receptacle or cover.

I preferably construct this strap as a wire loop comprising the cross stretches 32, 32, bent to form the bight portion 34. The wire is preferably a spring wire for rendering the same substantially stiff and acting with pressure upon the bottle when holding the same in place, and also to prevent bending of the wire stretches upon endwise pressure or tension being exerted upon the same. The substantially stiff strap is pivotally connected with one of the side walls, the other of the side walls being provided with a latch to receive the other end of the strap in such manner as to hold the same in fixed relation to said side wall in directions perpendicular to said side wall.

The pivotal connection is preferably a releasable connection, and is exemplified as formed by means of a flanged plate 36 having an inwardly extending flange 37, preferably perpendicular to the wall 16, to which the flanged plate is suitably secured, as by means of rivets 38. The flange is provided with an aperture 39.

The stretches of the wire loop are, adjacent to their free ends, provided with bent sections 41, bent toward each other, the outer ends of the respective stretches being bent laterally away from each other, as shown at 42, for forming inwardly extending recesses 43, the inner walls of which are located between the bent portions 41, 42. The outer ends 42 are also bent to one side of the plane of the wire loop slantingly from each other, with the extreme free ends of the laterally bent ends bent slightly toward the plane of the wire-loop, as shown at 45. This construction permits ready reception of said free ends into the aperture 39, by pressing the free ends of the wire-loop toward each other so that the inner walls of the recesses 43 pass each other, and passing one of said extreme free ends inwardly through the aperture while canting the wire-loop to one side and then turning the wire-loop on its longitudinal axis for entering the other of said free ends into said aperture, the operation being exemplified in Fig. 6.

In this manner hooks are formed at the free ends of the wire-stretches which are readily releasably received through the aperture and are located at the inner face of the flange 37, the inner walls of the recesses 43 and the inwardly bent portions 41 impinging the outer surface of said flange 37 for resiliently holding the wire-loop when pressing the stretches thereof downwardly across the bottle, when the cover is open, as in Figs. 2 and 4.

The other wall of the cover is provided with a latch 48, shown as comprising a plate 49, which is suitably secured to said other wall, as by means of rivets 50, and an inwardly extending hook 51, which is substantially parallel with said plate. The bight 34 is received into the space 52 between said hook and plate, this space being of a width preferably to just receive the bight of the wire and to hold the wire so as to prevent movement thereof in both directions perpendicular to said side wall of the cover, and thus to hold both side walls of the cover firmly in mutual relation, the connection of the free ends of the wire-loop being such also as to clampingly hold said free ends to the flange, so as to prevent movement between said free ends of the wire-loop and the side wall to which they are attached in both directions perpendicular to said side wall.

The wire-loop presses upon the bottle, the stretches of the wire-loop pressing upon the same in separated relations adjacent to the middle of the bottle for exerting pressure throughout the entire length of the bottle to hold the same in the cover, even when the cover is in closed relation with its open end presented downwardly to the body of the lunch kit.

Having thus fully described my invention, what I claim as new and desire to secure by Letters Patent, is:

1. In a lunch kit, the combination of a cover arranged to receive a heat-insulated bottle, a substantially stiff strap pivoted to one wall of said cover and extending across the bottle-position to hold the bottle in said cover, and a latch for said strap on the opposite wall of said cover, said latch and substantially stiff strap comprising coacting means limiting movement between said latch and strap and between the opposite walls of said cover in opposite directions lengthwise of said strap.

2. In a lunch kit, the combination of a cover comprising opposite walls, a resilient wire-loop between said walls extending across the bottle position in the inside of the lunch kit and arranged to act resiliently on the bottle in bottle position to hold the bottle in bottle position, and a latch on one of said walls, said wire-loop having pivot-connection with the other of said walls, said pivot-connection constructed and arranged whereby said wire-loop is releasable from said other of said walls, and the said latch having a latching face presented toward said first-named one of said walls and coacting with said loop and said pivot-connection to limit separation between said walls in the direction of the length of said wire loop.

3. In a lunch kit, the combination of a bottle-receptacle arranged to receive a bottle lengthwise thereof, said receptacle comprising opposite side walls, a flange extending inwardly from one of said side walls, said flange provided with an aperture, a wire-loop formed of spring wire bent adjacent the free ends thereof toward each other from the separated stretches of said loop and the free ends of said loop bent away from each other to form inwardly oppositely extending recesses in the free end portions of said wire-loop, said bent free ends of said loop received through said aperture for locating the inner stretches of the walls of said recesses in said aperture, and a latch on the other side wall of said receptacle arranged to receive and hold the bight end of said loop against movement in both directions perpendicular to said last-named side wall with said wire-loop received across the bottle-position to hold said side walls at fixed distance from each other.

In testimony whereof, I have hereunto signed my name in the presence of two subscribing witnesses.

GEORGE P. ALTENBERG.

Witnesses:
IVY M. PENCE,
CARL NASSE.